(12) United States Patent
Das

(10) Patent No.: US 7,308,788 B1
(45) Date of Patent: Dec. 18, 2007

(54) ENGINE AND METHOD FOR COUNTERACTING FACE PLUGGING OF A DIESEL OXIDATION CATALYST

(75) Inventor: Pranab K. Das, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/537,225

(22) Filed: Sep. 29, 2006

(51) Int. Cl.
*F01N 3/00* (2006.01)

(52) U.S. Cl. .............................. 60/297; 60/280; 60/279; 60/302

(58) Field of Classification Search .................. 60/280, 60/279, 284, 302, 297
See application file for complete search history.

(56) References Cited

U.S. PATENT DOCUMENTS

| | | | |
|---|---|---|---|
| 3,791,143 A | 2/1974 | Keith et al. | |
| 3,896,616 A | 7/1975 | Keith et al. | |
| 4,404,804 A * | 9/1983 | Tadokoro et al. ............. | 60/602 |
| 4,916,898 A | 4/1990 | Gandhi et al. | |
| 5,233,831 A * | 8/1993 | Hitomi et al. ................ | 60/284 |
| 5,248,251 A * | 9/1993 | Dalla Betta et al. ............ | 431/7 |
| 5,258,349 A * | 11/1993 | Dalla Betta et al. ........ | 502/330 |
| 5,709,081 A * | 1/1998 | Bruestle ....................... | 60/274 |
| 6,005,121 A * | 12/1999 | Ebner et al. ................ | 549/259 |
| 6,044,644 A | 4/2000 | Hu et al. | |
| 6,185,938 B1 * | 2/2001 | Zander et al. ................ | 60/597 |
| 6,254,842 B1 | 7/2001 | Hu et al. | |
| 6,415,600 B1 * | 7/2002 | Lejon .......................... | 60/280 |
| 6,497,851 B1 | 12/2002 | Hu et al. | |
| 6,519,931 B2 * | 2/2003 | Fujieda et al. ................ | 60/280 |
| 6,823,660 B2 * | 11/2004 | Minami ....................... | 60/280 |
| 6,875,725 B2 | 4/2005 | Lindner et al. | |
| 2006/0053776 A1 * | 3/2006 | Ancimer et al. ............ | 060/286 |
| 2006/0117742 A1 * | 6/2006 | Bellinger et al. ........... | 060/288 |

\* cited by examiner

*Primary Examiner*—Thomas Denion
*Assistant Examiner*—Mary A Davis
(74) *Attorney, Agent, or Firm*—Jeffrey P. Calfa; Gerald W. Askew

(57) ABSTRACT

A turbocharged engine (20, 20', 20", 20''') counteracts plugging of a diesel oxidation catalyst (DOC 48) by causing a first portion of exhaust from one or more exhaust manifolds (26, 28) to enter the DOC after having passed through the turbocharger (30), and causing a second portion of the exhaust (HEG) to enter the DOC without passing through the turbocharger.

5 Claims, 4 Drawing Sheets

ENGINE AND METHOD FOR COUNTERACTING FACE PLUGGING OF A DIESEL OXIDATION CATALYST

FIELD OF THE INVENTION

This invention relates to diesel engines, especially ones that are used as powerplants in motor vehicles like large trucks and that have diesel oxidation catalysts (DOC's) as components of exhaust after-treatment systems. More particularly, the invention relates to an engine and method for counteracting face plugging of a DOC.

BACKGROUND OF THE INVENTION

A known diesel exhaust after-treatment system comprises a DOC in upstream flow relation to a catalyzed diesel particulate filter (CDPF). A CDPF is a diesel particulate filter (DPF) that has some catalyst on it. While a CDPF is more commonly used for filtering particulate matter, it is known to use a DPF without any catalyst for the same purpose, and the two terms are often used interchangeably. For the after-treatment system to effectively treat exhaust, the temperature of the exhaust must exceed the "light off" temperature of the DOC. In a turbocharged diesel engine, the DOC is in downstream flow relation to the turbocharger turbine, and for certain engine operating conditions, such as light engine load and low engine speed, the temperature of exhaust leaving the turbine may not exceed the DOC "light off" temperature, which is typically around 270° C. Failure of the DOC to "light off" can lead to face plugging by entrained matter in the exhaust, and that can have undesired consequences on operation of the after-treatment system and its components. Attaining "light off" temperature becomes more difficult as the ambient temperature gets colder, and is perhaps most noticeable at engine cold start.

Consequently, it would be desirable to accelerate the attainment of DOC "light off" temperature at engine starting, especially at cold ambient, and to maintain "light off" temperature over a more extensive range of engine operation, especially operation at light loads and low speeds.

SUMMARY OF THE INVENTION

It is toward that objective that the present invention is directed.

Generally speaking, the invention provides for some fraction of the exhaust leaving an exhaust manifold to be diverted from the turbocharger turbine and delivered directly to the DOC. In other words, the invention provides for a limited amount of the exhaust leaving an exhaust manifold to bypass the turbocharger and enter the DOC along with the exhaust that is allowed to flow through the turbocharger. Because the bypass exhaust coming directly from the exhaust manifold is typically significantly hotter than the exhaust leaving the turbocharger, the heat energy input to the DOC is increased over the heat input to the DOC without the bypass. The resulting temperature increase promotes early "light off" for a cold engine and helps to maintain already attained "light off" temperature. It may also avoid having to use a separate heater.

The bypass flow can be controlled in various ways. One way is by operating the existing EGR valve in a manner that provides the bypass flow to the DOC to achieve a desired exhaust temperature input to the DOC. Another way is by including a bypass control valve in the bypass passage that can be adjusted to control bypass flow in accordance with any desired control strategy, such as to control exhaust temperature entering the DOC.

Accordingly, one generic aspect of the present invention relates to an internal combustion engine comprising: an exhaust system comprising one or more exhaust manifolds and one or more after-treatment devices including a diesel oxidation catalyst (DOC) and a turbocharger comprising one or more turbine stages operated by exhaust from the exhaust manifolds, wherein the exhaust system is arranged such that a first portion of the exhaust from the one or more exhaust manifolds enters the DOC after having passed through the turbocharger and a second portion of the exhaust from the one or more exhaust manifolds enters the DOC without passing through the turbocharger.

Another generic aspect relates to a method for counteracting plugging of a DOC in an exhaust system of a turbocharged internal combustion engine. The method comprises causing a first portion of exhaust from one or more exhaust manifolds of the engine to enter the DOC after having passed through the turbocharger, and causing a second portion of the exhaust from the one or more exhaust manifolds to enter the DOC without passing through the turbocharger.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
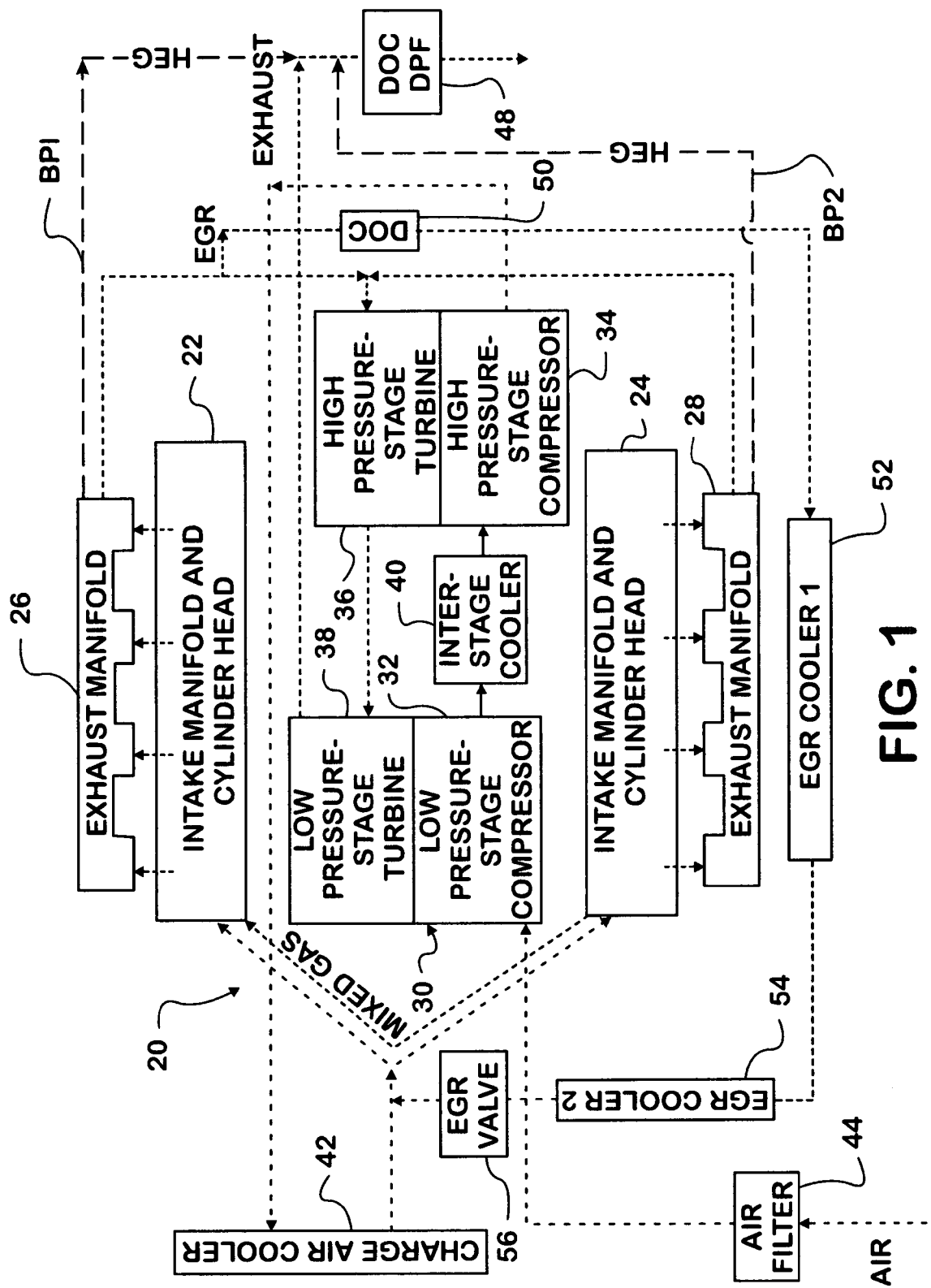
FIG. 1 is a general schematic diagram of an exemplary diesel engine illustrating a first embodiment of the invention.

FIG. 1 shows an exemplary turbocharged diesel engine 20 for powering a motor vehicle. Engine 20 is shown in a V-configuration to comprise intake manifolds and cylinder heads 22, 24 and exhaust manifolds 26, 28 associated with respective cylinder banks on each side of the engine. A two-stage turbocharger 30 comprises low- and high-pressure compressors 32, 34 and high- and low-pressure turbines 36, 38. An inter-stage cooler 40 is disposed between the compressor stages 32, 34, and a charge air cooler 42 is disposed between compressor stage 34 and the intake manifolds.

The engine intake system comprises an inlet containing a filter 44 for filtering particulate matter from air entering the intake system. The filtered air is drawn through compressor stage 32, inter-stage cooler 40, and compressor stage 34, and forced through charge air cooler 42 to provide charge air for the two intake manifolds. Charge air enters each engine cylinder from a corresponding intake manifold via a corresponding intake valve that opens and closes at proper times during engine cycles. Fuel injected into the cylinders combusts with the charge air to operate engine 20, creating exhaust in the process.

Exhaust passes from each cylinder into the respective exhaust manifold 26, 28 via a respective exhaust valve that opens and closes at proper times during engine cycles. The engine exhaust system conveys exhaust from exhaust manifolds 26, 28 to atmosphere. Exhaust leaving the exhaust manifolds come into confluence entering the turbocharger, and upon leaving turbine stage 38 the exhaust enters an after-treatment system. The particular after-treatment system of engine 20 comprises a DOC-DPF 48, and the reader should understand that the reference to a DOC-DPF implies that the DPF could be either a catalyzed or a non-catalyzed type.

Engine 20 also comprises an exhaust gas recirculation (EGR) system for controlling recirculation of some exhaust to the intake system for emission control purposes. The EGR system of engine 20 comprises a DOC 50, a first EGR cooler 52, a second EGR cooler 54, and an EGR valve 56. An engine control system controls EGR valve 56.

In accordance with principles of the invention, some of the exhaust that passes to atmosphere can bypass turbocharger 30 by flowing through respective bypass passages BP1, BP2 from exhaust manifolds 26, 28 directly to DOC-DPF 48. The exhaust flow through each passage is designated HEG (meaning, hot exhaust gas).

With the inclusion of bypass passages BP1, BP2, some fraction of the exhaust leaving an exhaust manifold is diverted from the turbocharger and the EGR system and is delivered directly to the DOC-DPF. Although the diverted exhaust does not contribute to turbocharger operation, engine operating conditions for which direct heating of the DOC-DPF by the diverted exhaust is beneficial are typically ones where the power loss doesn't significantly affect turbocharger performance. Because the diverted exhaust HEG is typically significantly hotter than the exhaust leaving the turbocharger, the heat energy input to DOC-DPF 48 is greater than it would be in the absence of such diversion, and the increased temperature can promote early "light off" for a cold engine and can help to maintain pre-existing "light off" temperature at DOC-DPF 48.

The bypass flow can be controlled by operating EGR valve 58 in a manner that provides bypass flow to DOC-DPF 48 at a rate that for its temperature and that of the exhaust from the turbocharger will provide a desired exhaust temperature input to the DOC-DPF.

Figure 2:
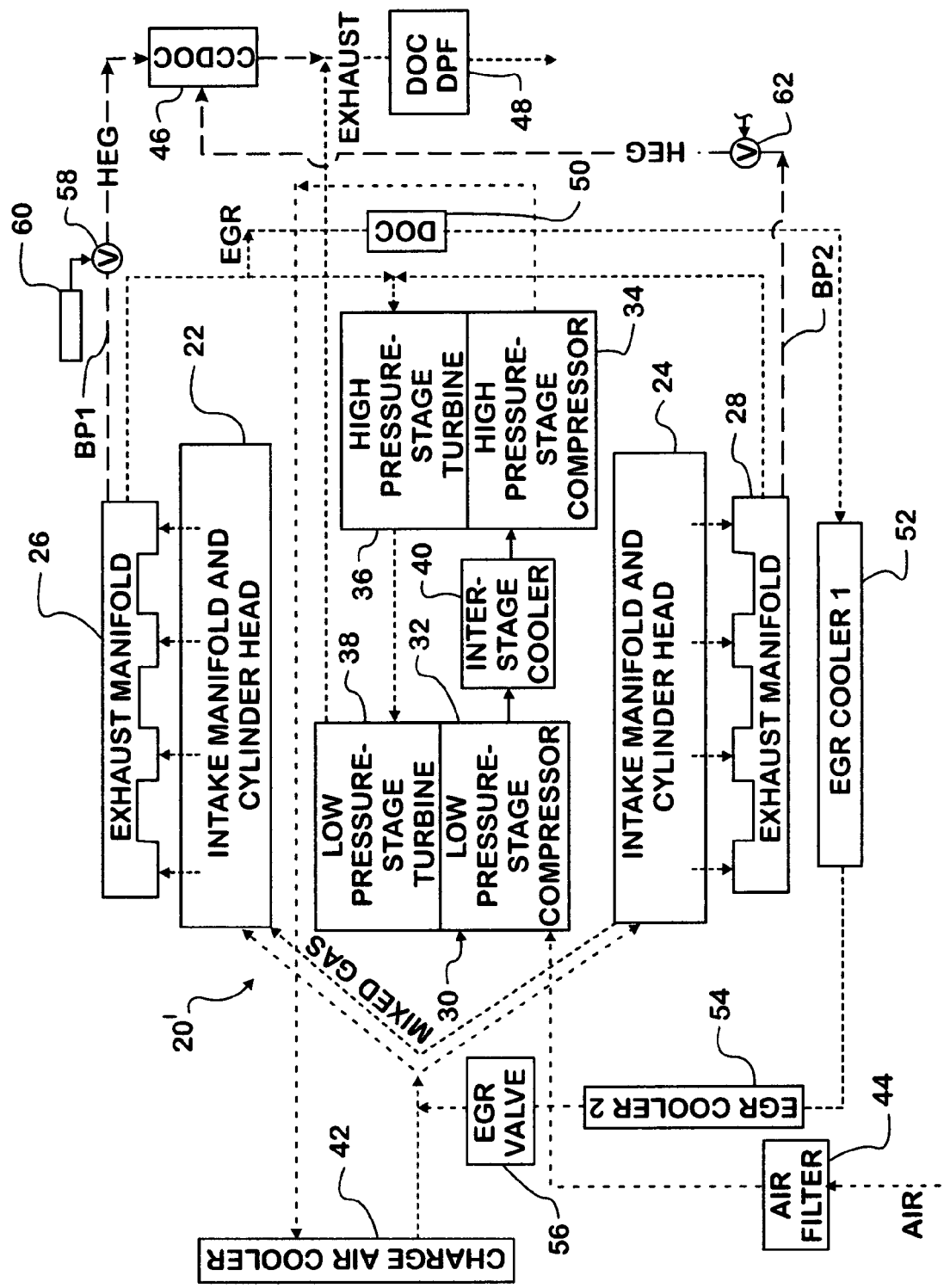
FIG. 2 is a general schematic diagram of an exemplary diesel engine illustrating a second embodiment of the invention.

FIG. 2 shows another exemplary turbocharged diesel engine 20' for powering a motor vehicle. The same reference numerals are used to designate like components. Engine 20' differs from engine 20 in the configuration of the after-treatment system and in the use of control valves in the bypass passages. The bypass passage BP1 from manifold 26 contains a control valve 58 that is controlled by a control strategy programmed in an engine control system 60. The passage from manifold 28 contains a control valve 62 that also is controlled by engine control system 60.

When valves 58 and 62 are open, some fraction of the exhaust leaving an exhaust manifold is diverted from both the turbocharger and the EGR system and is delivered directly to a "close-coupled" DOC (CCDOC) 46 that is in upstream flow relation to DOC-DPF 48. As was true for engine 20, the diverted exhaust does not contribute to turbocharger operation, but that is not significant for most operating conditions.

The significantly hotter diverted exhaust HEG passes first through CCDOC 46. The CCDOC is relatively smaller in size than DOC-DPF 48 and allows close-coupled packaging in the engine. Unburned hydrocarbons (HC) in the HEG leaving an exhaust manifold, either as a naturally occurring by-product of main combustion or incompletely burned post-injection of diesel fuel, are oxidized in CCDOC 46 immediately further elevating exhaust temperature before the exhaust enters DOC-DPF 48. Even if the oxidation that occurs in CCDOC 46 is incomplete, partial oxidation makes a useful contribution to heating at the inlet of DOC-DPF 48 that can aid in reducing the potential for face plugging of the DOC-DPF. With the CCDOC being close-coupled, face plugging of it is unlikely.

Figure 3:
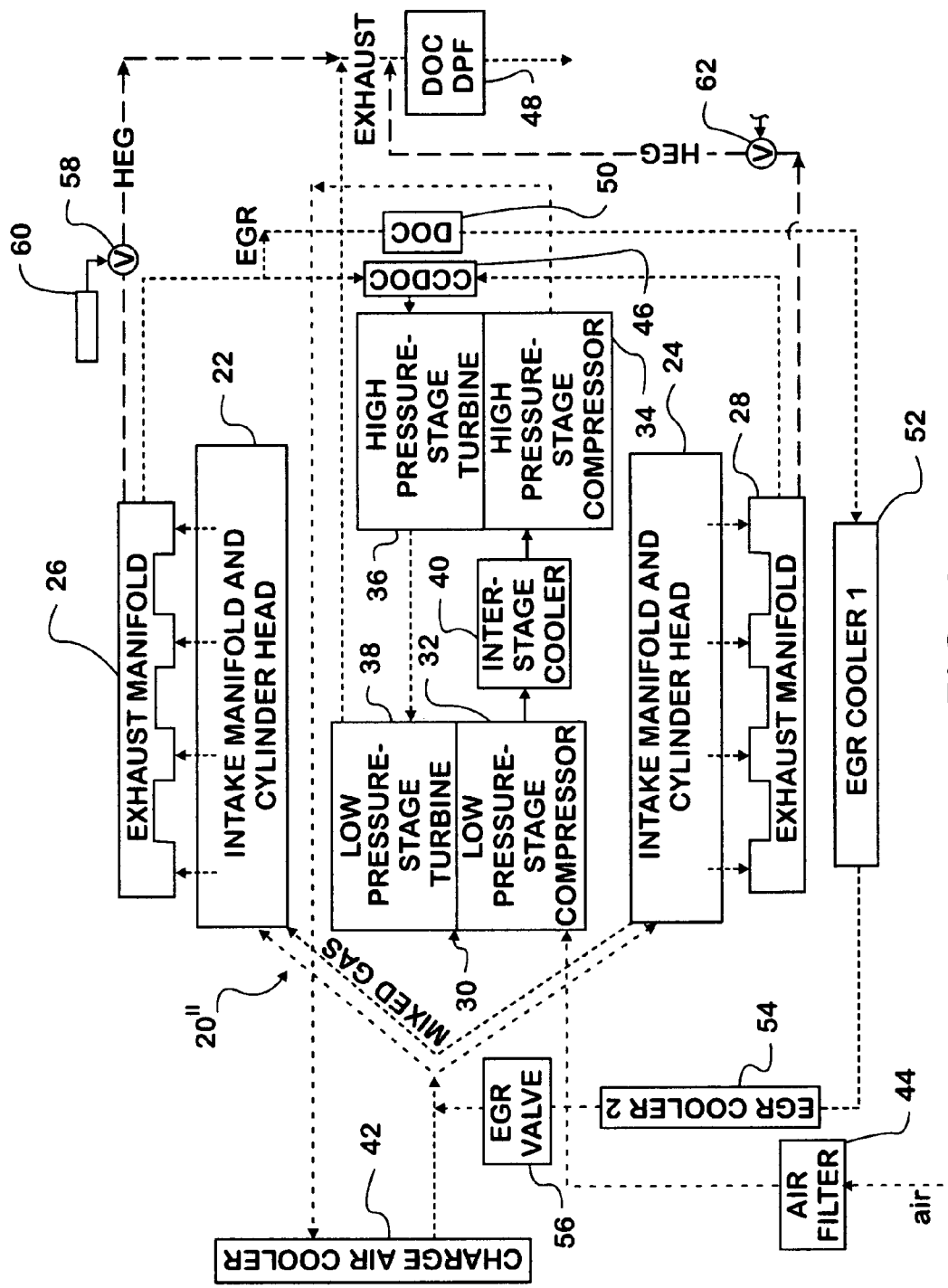
FIG. 3 is a general schematic diagram of an exemplary diesel engine illustrating a third embodiment of the invention.

FIG. 3 shows another exemplary turbocharged diesel engine 20" for powering a motor vehicle. The same reference numerals are used to designate like components. Engine 20" differs from engine 20 and engine 20' in the configuration of the after-treatment system. The CCDOC 46 is removed from the paths of the diverted exhaust flows to treat the confluent exhausts entering the turbocharger so that when valves 58 and 62 are open, the diverted exhaust gases are delivered directly to DOC-DPF 48. CCDOC 46 can here increase the temperature of exhaust leaving the turbocharger, and its inclusion may have some effect on engine performance because it does add a pressure loss upstream of the turbocharger.

Figure 4:
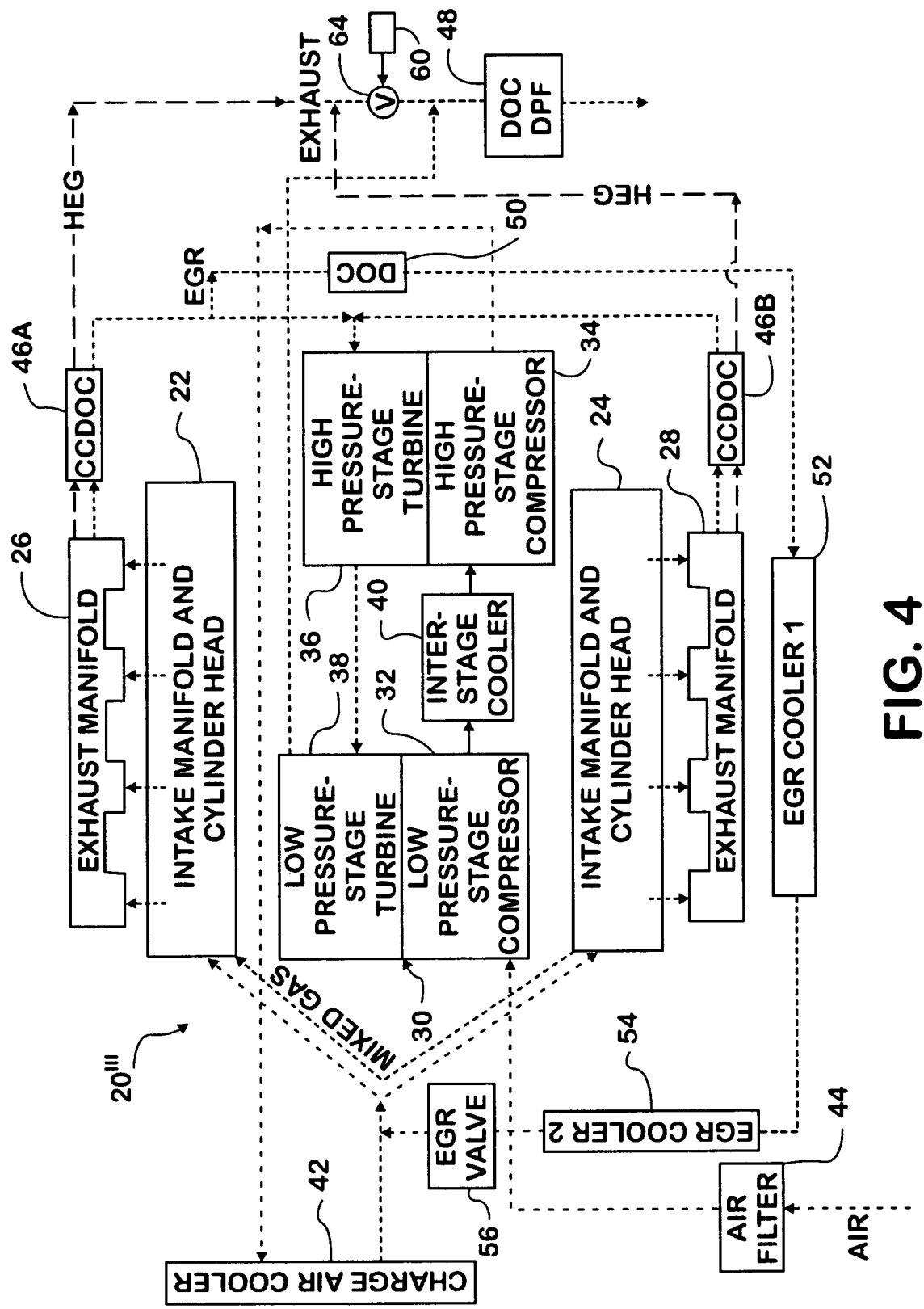
FIG. 4 is a general schematic diagram of an exemplary diesel engine illustrating a fourth embodiment of the invention.

FIG. 4 shows another exemplary turbocharged diesel engine 20''' for powering a motor vehicle. The same reference numerals are used to designate like components. Engine 20''' differs from the previous engines in the configuration of the after-treatment system. Engine 20" has two CCDOC's 46A, 46B instead of a single CCDOC 46. Each CCDOC 46A, 46B treats all the exhaust leaving each exhaust manifold 26, 28. A respective bypass passage BP1, BP2 extends from each CCDOC to a valve 64 controlled by control system 60. Consequently a single valve controls confluent exhaust flows coming directly from the exhaust manifolds. The valve outlet delivers the diverted flows for entrainment with the flow from turbine stage 38 as they enter DOC-DPF 48.

All embodiments that have been illustrated and described can elevate the temperature of exhaust entering the DOC-DPF through which all exhaust passes before exiting to atmosphere so that tendency toward face-plugging of the DOC-DPF is counteracted. While specific embodiments have been used, they should be understood as examples of the basic principles of the invention. For example, principles of the invention are useful in other than the V-type engines shown here.

Making the DOC a graded catalyst can enhance the effectiveness of the invention. A graded DOC has a higher catalyst density proximate its inlet and a reduced density toward its outlet. The higher density proximate the inlet can increase the oxidation rate at the face of the DOC thereby enhancing the anti-plugging effect of the invention. Once "light off" has been initiated, it can progress more easily through the DOC, and in the case of a CDPF, the reduced catalyst toward the outlet can reduce the potential for uncontrolled regeneration. Monitoring for uncontrolled regeneration can be improved by monitoring not only CDPF outlet temperature, but also rate of increase of CDPF outlet temperature.

While a presently preferred embodiment of the invention has been illustrated and described, it should be appreciated that principles of the invention apply to all embodiments falling within the scope of the following claims.

What is claimed is:

1. A diesel engine comprising:
an exhaust system comprising one or more exhaust manifolds and one or more after-treatment devices including a diesel oxidation catalyst (DOC) and a turbocharger comprising one or more turbine stages operated by exhaust from the one or more exhaust manifolds,
wherein the exhaust system is arranged such that a first portion of the exhaust from the one or more exhaust manifolds enters the DOC after having passed through the turbocharger and a second portion of the exhaust from the one or more exhaust manifolds enters the DOC without passing through the turbocharger,
wherein the second portion of the exhaust is delivered to the DOC through a passage extending from the one or more exhaust manifolds and comprising a close-coupled diesel oxidation catalyst (CCDOC) and a control valve,
wherein the control valve is located in the passage downstream of the CCDOC, upstream of the first portion of the exhaust, and downstream of the second portion of the exhaust for controlling flow through the passage.

2. An engine as set forth in claim 1 wherein the first portion of the exhaust also passes through the CCDOC before reaching the turbocharger.

3. An engine as set forth in claim 1 wherein the DOC comprises a graded DOC catalyst.

4. A method for counteracting plugging of a DOC in an exhaust system of a turbocharged diesel engine the method comprising:
causing a first portion of exhaust from one or more exhaust manifolds of the engine to enter the DOC after having passed through the turbocharger and causing a second portion of the exhaust from the one or more exhaust manifolds to enter the DOC without passing through the turbocharger by causing the second portion of the exhaust to pass first through a close-coupled diesel oxidation catalyst (CCDOC) in a passage from an exhaust manifold to the DOC, and
controlling flow through the passage by controlling a control valve located in the passage downstream of the CCDOC, upstream of the first portion of the exhaust, and downstream of the second portion of the exhaust.

5. A method as set forth in claim 4 comprising causing the first portion of the exhaust to pass through the CCDOC before reaching the turbocharger.

* * * * *